(12) United States Patent
Venkataraman et al.

(10) Patent No.: US 10,834,085 B2
(45) Date of Patent: Nov. 10, 2020

(54) METHOD AND APPARATUS FOR SPEEDING UP ACL RULE LOOKUPS THAT INCLUDE TCP/UDP PORT RANGES IN THE RULES

(71) Applicant: NXP USA, Inc., Austin, TX (US)

(72) Inventors: Krishnakumar Venkataraman, Chennai (IN); Sai Naidu Kamisetti, Hyderabad (IN)

(73) Assignee: NXP USA, INC., Austin, TX (US)

( * ) Notice: Subject to any disclaimer, the term of this patent is extended or adjusted under 35 U.S.C. 154(b) by 177 days.

(21) Appl. No.: 15/605,239

(22) Filed: May 25, 2017

(65) Prior Publication Data

US 2018/0302410 A1 Oct. 18, 2018

(30) Foreign Application Priority Data

Apr. 14, 2017 (IN) .............................. 2017-11013381

(51) Int. Cl.
| | | |
|---|---|---|
| *G06F 9/00* | (2006.01) | |
| *G06F 15/16* | (2006.01) | |
| *G06F 17/00* | (2019.01) | |
| *H04L 29/06* | (2006.01) | |

(52) U.S. Cl.
CPC ........ *H04L 63/101* (2013.01); *H04L 63/0245* (2013.01); *H04L 63/0263* (2013.01); *H04L 69/22* (2013.01)

(58) Field of Classification Search
CPC . H04L 63/101; H04L 63/262; H04L 63/0245; H04L 69/22; H04L 43/02; H04L 47/2483
See application file for complete search history.

(56) References Cited

U.S. PATENT DOCUMENTS

| | | | |
|---|---|---|---|
| 7,908,431 B2 | 3/2011 | Krishnan | |
| 8,576,841 B2 | 11/2013 | Ramaraj et al. | |
| 9,306,848 B2 | 4/2016 | Basso et al. | |
| 2003/0108043 A1 | 6/2003 | Liao | |
| 2006/0221956 A1* | 10/2006 | Narayan | H04L 45/54 370/389 |
| 2006/0221967 A1* | 10/2006 | Narayan | H04L 63/101 370/392 |
| 2007/0006293 A1* | 1/2007 | Balakrishnan | H04L 63/1408 726/13 |
| 2009/0199266 A1* | 8/2009 | Kling | H04L 63/0263 726/1 |

(Continued)

OTHER PUBLICATIONS

NXP Freescale Semiconductor, Designing Firewall/VPN with the PowerQUICC III MPC8572E, white paper, Rev. 0, Jan. 2007.

(Continued)

*Primary Examiner* — Darshan I Dhruv (57) ABSTRACT

A hardware access control list (ACL) table is used to evaluate a received network packet to identify a first rule key portion in the hardware ACL table having a first address range indicator value that matches with an address value in the network packet, and the first rule key portion is then used to search a software-maintained list of extended check nodes linked with the first rule key portion to identify a first extended check node having a first address range value that matches with the address value in the network packet and to select one or more actions contained in the first extended check node to be performed by the networking element.

18 Claims, 8 Drawing Sheets

(56) References Cited

U.S. PATENT DOCUMENTS

| | | | |
|---|---|---|---|
| 2013/0239193 A1* | 9/2013 | Bouchard | H04L 63/08 726/7 |
| 2013/0268729 A1* | 10/2013 | Manhas | H04L 63/0263 711/108 |
| 2014/0050002 A1* | 2/2014 | Sun | G11C 15/00 365/49.1 |
| 2014/0082122 A1* | 3/2014 | Basso | G06F 16/90339 709/213 |
| 2014/0244840 A1* | 8/2014 | Sweeney | H04L 45/745 709/225 |
| 2015/0127900 A1* | 5/2015 | Dharmapurikar | G11C 15/04 711/108 |
| 2016/0156591 A1* | 6/2016 | Zhou | H04L 63/0263 726/13 |
| 2016/0191530 A1 | 6/2016 | Jain et al. | |
| 2017/0346790 A1* | 11/2017 | Duda | H04L 63/0236 |
| 2018/0007005 A1* | 1/2018 | Chanda | H04L 63/0263 |

OTHER PUBLICATIONS

Zheng Xu, Freescale, LS2085/8A Freescale's new QorIQ Layerscape Communications Processor, Aug. 2015.
Murthy Prakki, NXP Freescale, Freescale Technology Forum, Intrusion Prevention—Contemporary Techniques FTF-NET-F0353, Jun. 2011.

* cited by examiner

METHOD AND APPARATUS FOR SPEEDING UP ACL RULE LOOKUPS THAT INCLUDE TCP/UDP PORT RANGES IN THE RULES

BACKGROUND OF THE INVENTION

Field of the Invention

The present invention is directed in general to field of computer networks. In one aspect, the present invention relates to techniques for managing packet flows in computer networks.

Description of the Related Art

Network firewalls typically are configured to use access control lists (ACLs) having rules that are applied to control various networking functions of a computing device based on various rule criteria, such as IP addresses, protocols, and/or TCP/UDP port values. For example, computing devices, such as routers, firewalls, gateways, switches and other network devices, often apply filters when processing packet flows by performing a table lookup of rules in an access control list to determine how an inbound network packet (e.g., from a remote device or a virtual machine switch) should be processed and/or how outbound network traffic should be handled. The filtering rules use rule criteria, such as specified source IP addresses, destination IP addresses, and other criteria, to identify packets as well as one or more actions to perform on packets that match the specified rule criteria. Specifically, a router may identify packets that match the filtering rules and perform the one or more actions on the packets depending on which filtering rule(s) the packets match. The actions may include dropping the packet, re-marking the priority of the packet, counting packets that match the filtering rule, replicating the packet for logging or further analysis, and the like. For example, a filter may be installed within a router to cause the router to drop packets having a source IP address of a device that has been identified as sourcing a denial of service (DoS).

ACLs have been implemented in hardware by using content-addressable memory (CAM) to perform lookup functions very quickly, but such hardware ACLs typically only support port values and masks, and do not support true port ranges that are increasingly required by applications. In order to provide enough CAM resources and/or other hardware lookup resources to handle true port range values would be prohibitively expensive in terms of hardware cost and/or power consumption. Alternatively, software-implemented ACL solutions may be employed for access control, but they generally suffer from slower processing rates or otherwise poor performance which may be unacceptable for many applications. For example, ACLs have been implemented in software to achieve excellent rule lookup performance, albeit with only little or no support for port range values. Alternatively, software ACLs have been provided to support true port range values, but at the expense of reducing the rule lookup performance. As seen from the foregoing, the existing solutions are extremely difficult at a practical level by virtue of the difficulty in efficiently supporting true port range values in ACL rules with very high performance ACL rule lookup during packet processing when there are large numbers of ACL rules configured.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An apparatus, system, and methodology are described for accelerating access control list lookup operations with support for rules which have true port range criteria by constructing port range rules to include a rule-key portion and extended check node during configuration. In selected embodiments, the rule-key portion is configured with predetermined parameter fields (e.g., Source IP, Source Port, Destination IP, Destination Port, Protocol, the ingress and egress interfaces) that may be stored in an hardware access control list (ACL) table, and the extended check node is configured with the rule's priority, port range, and action that may be stored in a software-maintained list. By separating the port range field from the remaining rule-key parameters, ACL table lookup operations may be accelerated during session creation by using hardware ACL to perform a partial rule lookup in the ACL table, and then using software to complete the rule matching lookup of a software-maintained list to provide true port range support. The disclosed configuration of rule-keys and extended check nodes supports true port range in ACL rules while also delivering very high performance ACL rule lookup during packet processing without any restrictions on the number of rules or the port range values or rule ordering. This is achieved by constructing the ACLs in such a way that software is able to utilize the hardware ACL to the best possible extent during rule search and perform extended software search to complete the rule matching.

Figure 1:
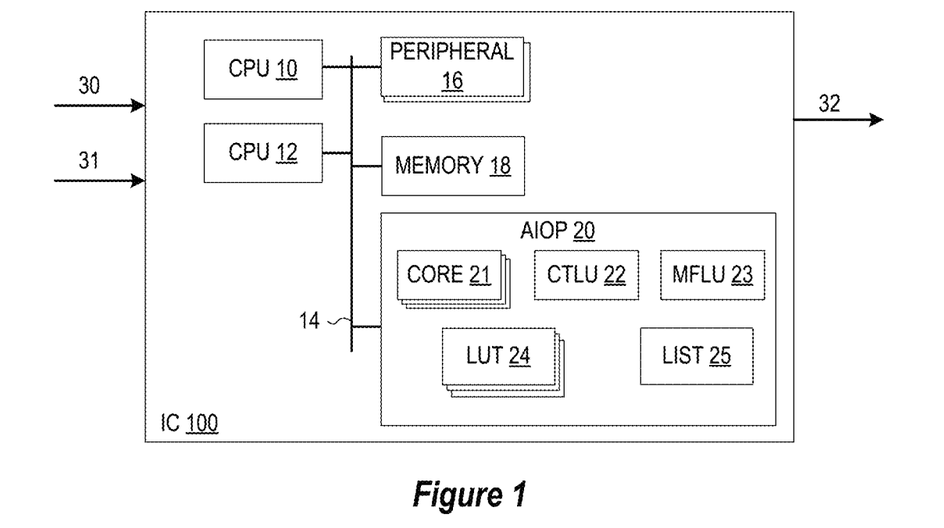
FIG. 1 depicts a block diagram of an integrated circuit apparatus which performs port range rule lookups in accordance with selected embodiments of the present disclosure.

To provide a contextual understanding for selected embodiments of the present disclosure, reference is now made to FIG. 1 which shows a simplified block diagram of an example integrated circuit apparatus 100 which performs packet filtering operations on input data packet flow units received at the data input 30. To specify or control the packet filtering operations, the IC apparatus 100 may also include a configuration input 31 for receiving configuration input values, though in other embodiments, the data input 30 and configuration input 31 may be the same input. Depending on the results of the packet filtering operations, the IC apparatus 100 generates output data packet flow units at the data output 32 which pass the packet filtering operations.

The depicted integrated circuit 100 may embody an integrated circuit data processing device, such as a microprocessor, microcontroller, digital signal processor or other suitable type of SoC, which includes one or more central processing units (CPU) or cores 10, 12. Additionally, the data processing device may include one or more peripherals 16 (such as co-processors, communication interfaces, etc.), a memory 18 (such as on-chip flash or RAM) and/or dedicated hardware accelerators 20 (such as an advanced input/output processor (AIOP) hardware circuit). With multiple cores, a first processor core 10 may execute instructions relating to control path or policy enforcement, while a second processor core 12 may execute instructions relating to data path or flow forwarding. While two cores 10, 12 are shown, it will be appreciated that additional cores (e.g., 4, 8, 16, 32, 64 or any other number) may be used as suitable for the specific implementation. Each processor core may be configured with logic required to execute program code in the form of machine code using one or more ARM cores, an instruction decoder, an arithmetic unit, an address generation unit, a load/store unit, and internal memory (e.g., L1 data and instruction cache for each ARM core, banked L2 cache), alone or in combination with inputs/outputs, communication interfaces, coprocessors, analog-to-digital converters, clocks, voltage regulators, memory (such as for instance flash, EEPROM, RAM), error correction code logic, timers or other suitable components. In addition, each core 10, 12 is connected over a coherency fabric or bus 14 to one or more peripherals 16, memory 18 (e.g., L3 cache), and an advanced input/output processor (AIOP) hardware circuit 20 to implement a data packet processing accelerator. While the integrated circuit apparatus 100 may be implemented in any of a variety of network devices, such as routers, firewalls, gateways, switches or the like, the integrated circuit apparatus 100 may be embodied in one or more integrated circuit devices that are formed using photolithography on a monolithic semiconductor substrate. In selected embodiments, the integrated circuit apparatus 100 may comprise an application specific integrated circuit, field programmable gates arrays, a network processor or other microprocessor, or a system on chip (SoC).

In selected embodiments, the integrated circuit apparatus 100 may implement a high performance, cost effective security appliance which is connected to receive incoming data packet flow at the data input 30, filter the incoming data packet flow to selectively block or forward the data flow to the data output 32 for further processing. For example, the integrated circuit apparatus 100 may implement a network packet filtering or classification system which provides a firewall function to stop unwanted incoming data packet flow at the data input 30 from entering or leaving the integrated circuit apparatus 100 by comparing packet header information from the incoming data packet flow against rule criteria to generate a "pass" or "fail" indication in respective of the incoming packet flow. To characterize the flow of incoming packets received at the data input 30, one or more selector values (e.g., a 5-tuple) may be extracted from the packet header (e.g., <SrcIP, DstIP, protocol, SrcPort, Dport>) at the IC apparatus 100. If the selector values of a received packet match with specified rule criteria at the IC apparatus 100, then the action specified by the rule is applied to the packet. The actions may include dropping the packet, re-marking the packet as lower priority, counting packets that match the filtering rule, replicating the packet for logging or further analysis, and the like.

To filter the incoming packet at the data input 30, the IC 100 may use one or more lookup tables 24 to store filtering rules in a suitable location, such as the memory 18 and/or an advanced input/output processor (AIOP) hardware circuit 20. Wherever stored, each lookup table 24 may store a plurality of rules, each including a filter-key as an table index and a specified rule action, with each filter-key including one or more key-bits, each corresponding to a filter configurable by a corresponding filter configuration value. In accordance with the present disclosure, one or more of the lookup tables 24 may include an access control list (ACL) which provides a policy enforcement mechanism with respect to incoming packets at the data input 30 having specified or well-known port numbers. For example, an ACL rule for incoming Web traffic packets can be defined as follows:

"Allow traffic from the Outside Network to DMZ1 if the protocol is TCP and the destination port number is 80."

With this rule in place, the policy enforcement operation will match the selector values of a received packet at the data input 30 against the rules configured in the ACL lookup table 24, and once there is a match, all subsequent packets belonging to the flow is "allowed" and/or forwarded to the data output 32 (since that is the rule action for packets meeting the rule criteria). Of course, a matching rule action may also specify that an incoming packet is to be dropped, such as can occur when an incoming data packet flow is known to be associated with a security risk. In addition, any incoming data packet flow having selector values which do not pass the filtering process should be ignored (in terms of automatic flow forwarding) or processed further with control path policy enforcement processing.

ACL filtering has conventionally been implemented with hardware accelerators, such as ternary CAMs, but as the number of subscribers increases, these expenses increase as substantial resources are required to store and select the filters for each subscriber. Moreover, existing applications can require that thousands of rules be handled with an ACL lookup table, and increasingly, one or more of the ACL rules may specify a TCP/UDP port range as part of the rule criteria. For example, applications may require support for 128,000 ACL rules, with each rule supporting a TCP/UDP port range. Other applications may require support for 40,000 NAT rules which also include a TCP/UDP port range. With lookup operations for these rules being performed at the time of session creation, it is important to be able to create sessions at a high rate without regard to the rule configuration and should be consistent even as the number of configured ACL rules increases. Unfortunately, these challenges are not met by conventional ACL hardware which typically supports only key (ports) and masks, but not true-port-ranges that applications require. In addition, any attempt to convert true-port-ranges to a wild-card format that the ACL hardware understands results in rule explosion beyond certain combinations. As for any attempt to address these limitations by using software to perform ACL lookups, such software solutions drastically reduce the ACL rule lookup performance during session creation by adding computational complexity to the lookup process and requiring processor access to execute the software instructions.

Instead of implementing filtering using only expensive hardware accelerators (such as ternary CAMs, which are expensive devices) or only software (such as processing elements and memory structures), selected embodiments of the present disclosure use a combination of ACL hardware and software techniques to support true-port-ranges in ACL with improved ACL lookup performance, even when there are 128,000 ACL rules configured. In the example embodiment shown in FIG. 1, ACL lookup operations may be accelerated by configuring port range rules to include a rule-key portion of specified rule key parameters (that is stored in an ACL lookup table 24) and an extended check node portion of a specified port range (that is stored in an software-based list 25) during configuration. By separating the port range field from the remaining rule-key parameters, ACL table lookup operations may be accelerated during session creation by using accelerator hardware to perform a partial rule lookup in the ACL lookup table 24, and then using software to complete the rule matching lookup of a software-maintained list 25 to provide true port range support.

While any suitable accelerator hardware may be used, selected embodiments of the present disclosure may employ NXP's QorIQ® Layerscape® 2088 multicore communications processor to implement the AIOP hardware circuit 20 for implementing hardware ACL lookup operations. To meet network throughput requirements, the AIOP hardware circuit 20 may include on-die hardware accelerator units for commonly used functions in packet processing, including one or more processor cores 21, a classifier and table lookup unit (CTLU) 22, Multi Field Lookup Unit (MFLU) 23, and one or more lookup tables 24. In operation, the core(s) 21 execute control code logic or instructions to operate the AIOP hardware circuit's units. In particular, the CTLU 22 supports Exact Match (EM) and Longest Prefix Match (LPM) lookup tables 24, while the MFLU 23 supports algorithmic ACL lookup table 24. In addition, the lookup tables 24 are managed by the CTLU/MFLU hardware 22, 23 to support the addition, deletion, and/or modification of rules in the tables 24, to perform rule lookup operations in the tables 24, to run rule queries in the tables 24, and/or to iterate through rules in the tables 24. In particular, the MFLU hardware 23 provides the capability to support millions of rules using internal or external memory 18 by supporting lookup based on key or key ID along with rule priority by assigning a priority to each rule in the MFLU lookup table 24 to select the highest priority rule if multiple matching rules result from a table lookup operation.

Figure 2:
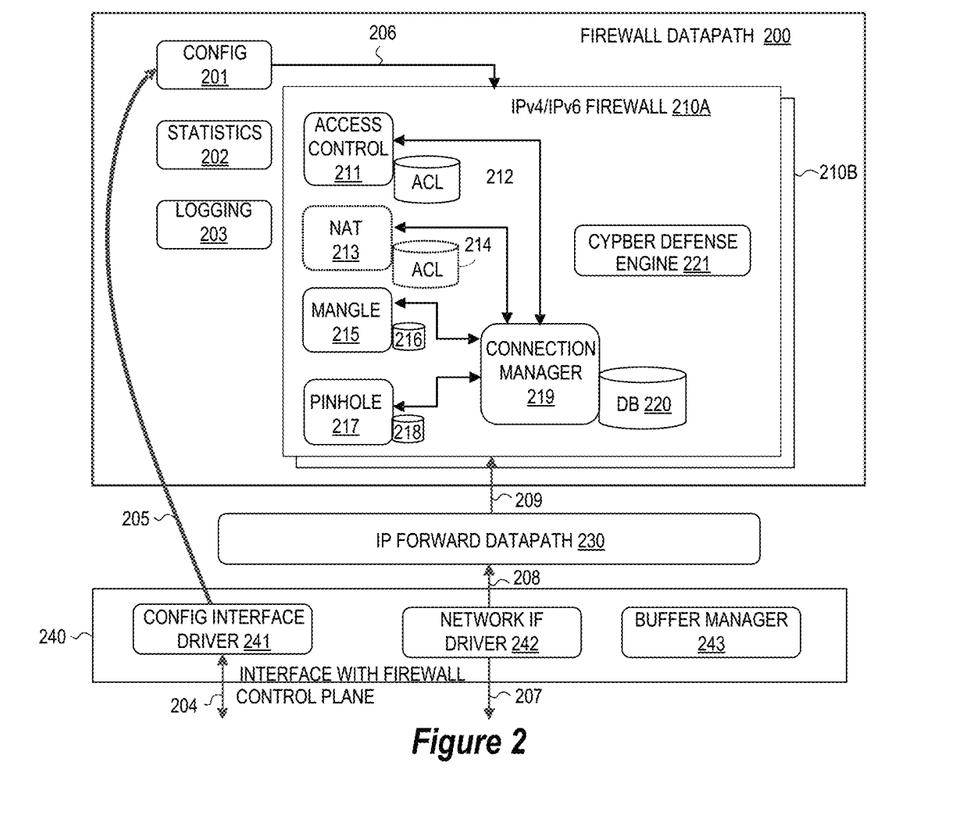
FIG. 2 depicts an overview diagram of firewall datapath architecture in accordance with selected embodiments of the present disclosure.

To provide additional details for an improved understanding of selected embodiments of the present disclosure, reference is now made to FIG. 2 which depicts an overview diagram of firewall data path architecture 200 which is implemented with control logic in a combination of a hardware accelerator (e.g., AIOP 20) and software processing on a host computing system, processor, or microcontroller unit that includes processor and memory (e.g., CPU 10). As indicated, the firewall interface 240 receives input configuration data 204 from the control plane, which the configuration interface driver 241 conveys to the configuration unit 201 in the firewall data path 200. In addition, the statistics unit 202 tracks TCP statistics and session inactivity, while the logging unit 203 tracks the logging activity.

Depending on the Internet Protocol (e.g., IPv4 or IPv6) for an incoming packet, the configuration data 206 is provided to the corresponding firewall 210A, 210B which provides the appropriate stateful session management. To this end, the IPv4 firewall 210A may include an access control unit 211 and associated ACL table 212, NAT unit 213 and associated ACL table 214, mangle unit 215 and associated database 216, pinhole unit 217 and associated database 218, connection manager unit 219 and associated database 220, and cyber defense engine 221 (which checks against attacks and floods, detects protocol anomalies, and performs port scanning detection). Alternatively, the IPv6 firewall 210B may include an access control unit 211 and associated ACL table 212, mangle unit 215, pinhole unit 217, connection manager unit 219 and associated database 220, and cyber defense engine 221. The IP forward datapath unit 230 receives the input 208 from the network interface driver 242 in the firewall interface 240 in response to the received incoming packet 207, and selects the appropriate firewall 210A, 210B to receive the input data 209. In this configuration, the control path determines the performance of the first or first few packets and then configures the access control rules 212 (and NAT rules 214) by providing configuration data 206 to the corresponding firewall 210A, 210B, and the data path 200 determines the performance of the rest of the packets in the flow. Since most information flows involve more than a few packets, the data path 200 largely determines the throughput performance of the firewall. As a result, the system performance may be increased by optimizing the data path to be implemented with a combination of the AIOP 20 (to perform ACL lookup operations) and a software component (to perform an extended check to find a rule with a matching port range). To the extent that the configuration processing is invoked with less frequency, the control plane may be implemented with a CPU 10.

Figure 3:
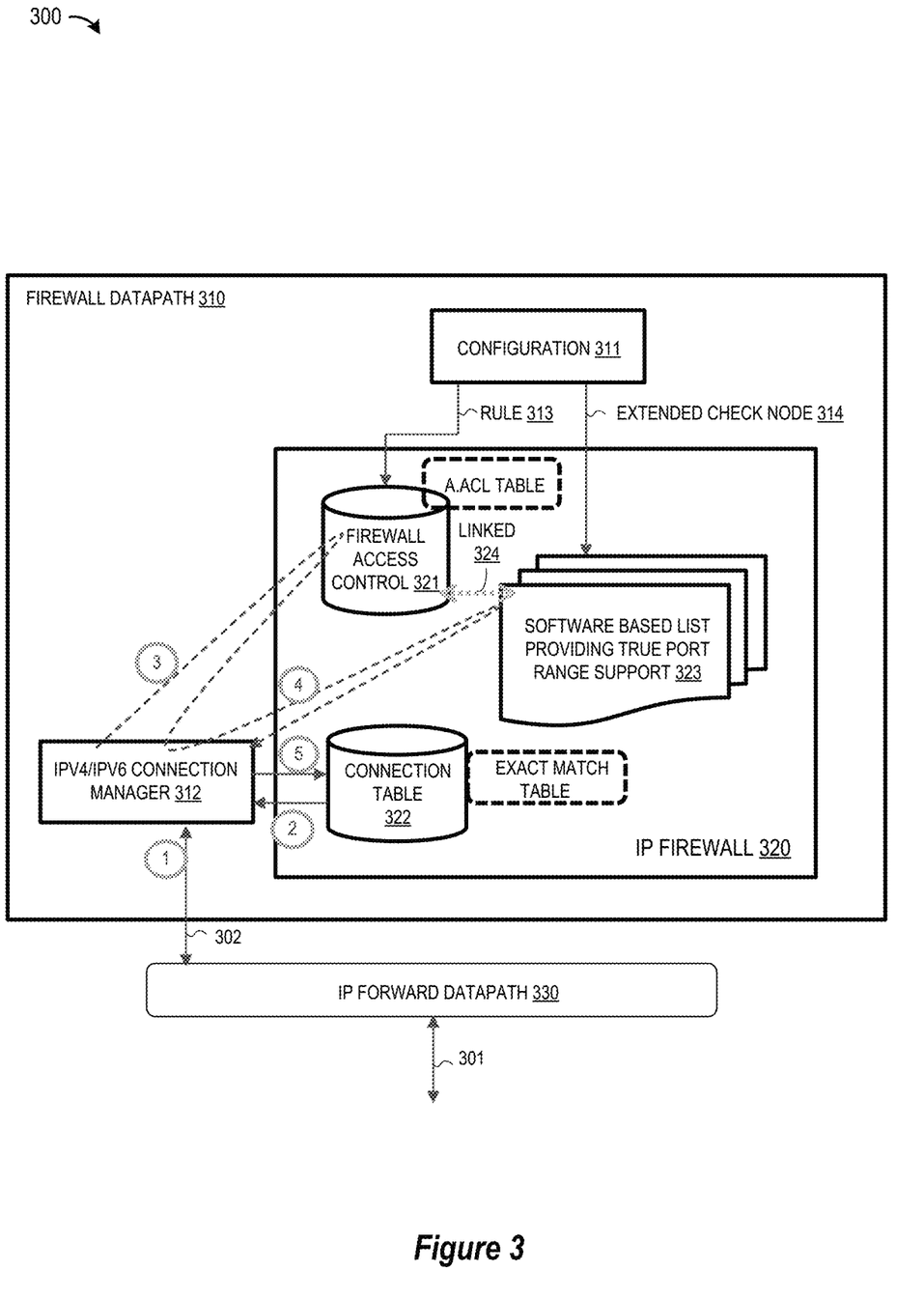
FIG. 3 depicts a firewall datapath flow for ACL configuration and packet processing in accordance with selected embodiments of the present disclosure.

To provide additional details for an improved understanding of selected embodiments of the present disclosure, reference is now made to FIG. 3 which depicts a firewall datapath flow 300 for ACL configuration and packet processing operations. In the depicted firewall datapath flow 300, a firewall datapath 310 configures firewall access control database 321 and associated software-based list 323 to support an unlimited number of port range rules, and then applies the rules during packet processing to input data 302 received from the IP forward datapath unit 330 in response to incoming data packets 301. In an example embodiment, the firewall datapath flow 300 may be implemented with control logic at a hardware accelerator (e.g., AIOP 20) and software executed at a processor (e.g., core(s) 21) to implement configuration and packet processing steps as described hereinbelow.

As a preliminary step in the firewall datapath flow 300, the configuration unit 311 constructs port range rules by generating a rule-key portion 313 and an extended check node portion 314 that are stored in the appropriate Internet Protocol firewall 320. In particular, the configuration unit 311 may create a rule key 313 that is hardware ACL compatible, such as by constructing the key rule 313 with parameters that include all packet fields except the port range for storage in the firewall access control database 321 as an algorithmic access control list (A.ACL) table which lists the filter rules that allow or deny traffic through the firewall 320. During configuration, the MFLU hardware accelerator 23 may be used to provide the matching fields (e.g., Source IP, Source Port, Destination IP, Destination Port, Protocol, the ingress and egress interfaces) in each rule key 313 for the algorithmic ACL tables that are used to search for the first matching rules. In addition to storing key rules 313 in the algorithmic ACL table 321, the configuration unit 311 creates an extended check node 314 for each port range rule for storage in a software-based list 323. In this way, each rule 313 in the algorithmic ACL table 321 may be associated or linked 324 with a software list 323 containing the rule's action, priority and port range. In order to reduce the number of extended-check nodes 314 associated with each rule 313, the configuration of the rule key 313 should be constructed to include as many bits from the "port" field as possible. In addition, the listing of extended check nodes in the list 323 should be arranged or ranked by priority, starting with the highest priority node and proceeding to the lowest priority node.

Upon configuration of the firewall datapath 310, the incoming data packets 301 are routed through the IP forward datapath 330 to the connection manager 312 (step 1) where they are processed to identify connections that are allowed through the firewall data path 310. As a preliminary packet processing step, the connection manager 312 searches the connection table 322 to find a matching connection. In selected embodiments, the search for an exact match may be performed in hardware, such as by using the classifier and table lookup unit 21 shown in FIG. 1. If the search for an exact match in the connection table 322 results in a failure or miss, then the connection manager 312 searches the firewall access control database 321 (step 3) to look for the first matching rule. If a matching ACL rule contains a port range, then the connection manager 312 performs an extended check on the software-based list 323 (step 4) to find a rule that has matching port range. Based on the matching ACL rule's action specified on the list 323, the connection manager 312 adds the connection to the connection table 322 (step 5) and the packet gets forwarded or packet is dropped, depending on the specified action from the list 323.

Figure 4:
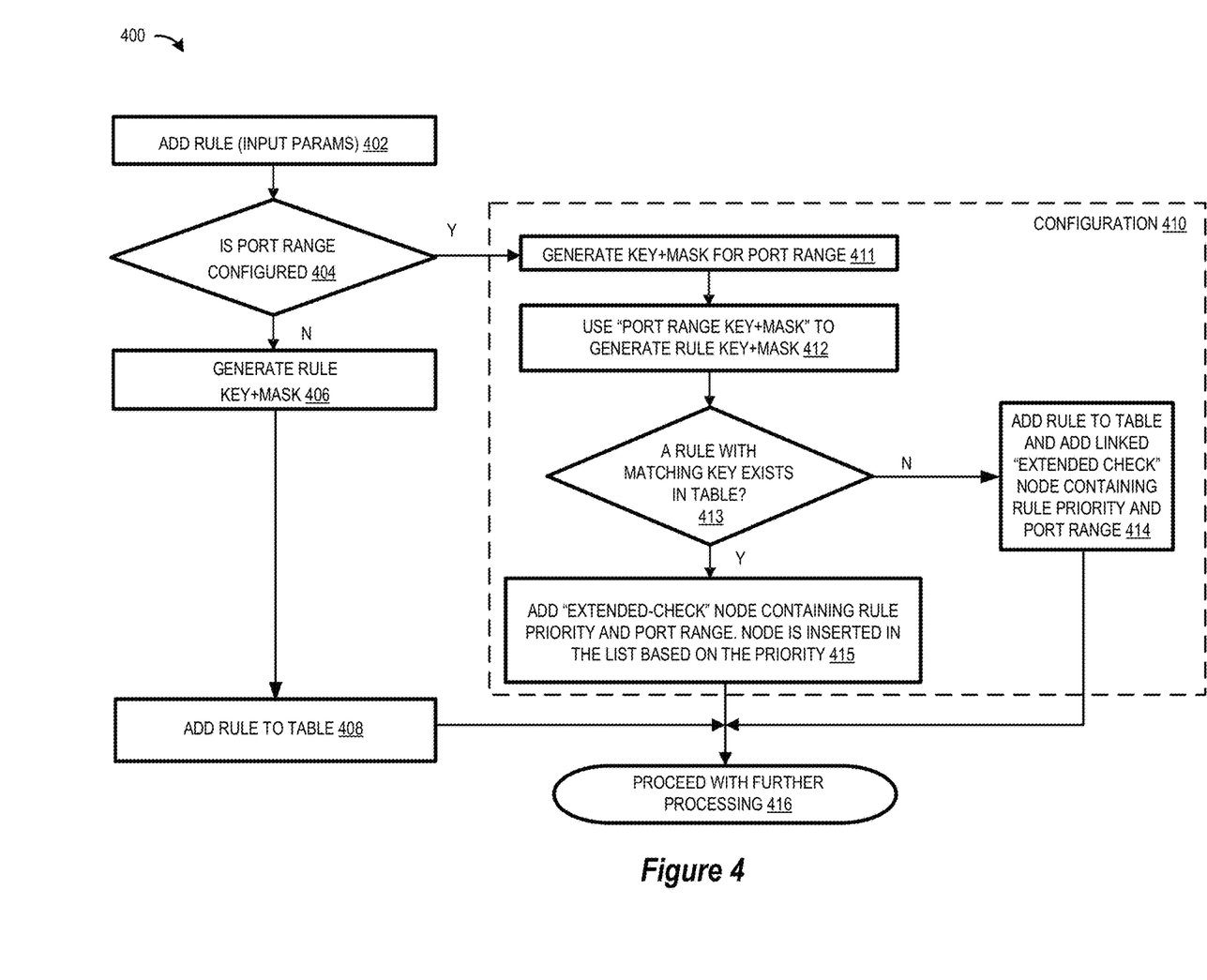
FIG. 4 depicts a simplified flow chart showing the configuration logic for constructing rule keys and extended check nodes for port range rules in accordance with selected embodiments of the present disclosure.

To provide additional details for an improved understanding of selected embodiments of the present disclosure, reference is now made to FIG. 4 which depicts a simplified flow chart 400 showing the configuration logic for configuring rule keys and extended check nodes for port range rules in accordance with selected embodiments of the present disclosure. In an example embodiment, the control logic and methodology shown in FIG. 4 may be implemented in software on a host computing system, processor, or microcontroller unit that includes a processor and memory for storing control code for configuring ACL lookup tables and extended node software list as described herein.

The configuration process starts (step 402) when a rule is added to the access control list by extracting one or more input parameters for the rule. In selected embodiments, the processing at step 402 may be implemented by the AIOP 20 which receives and processes the packet with software running on the AIOP core 21 which extracts specified packet field data (e.g., Source IP, Source Port, Destination IP, Destination Port, Protocol, the ingress and egress interfaces) from the proposed rule.

At step 404, the configuration process determines if one of the input parameters for the rule specifies a port range. If the rule is not configured as a port range rule (negative outcome to detection step 404), a key and mask are generated for the rule (step 406), and the rule is added to the lookup table (step 408) before proceeding with further processing (step 416). As disclosed herein, the processing at step 408 may be implemented with the MFLU hardware accelerator 23 which extracts specified packet field data (e.g., Source IP, Source Port, Destination IP, Destination Port, Protocol, the ingress and egress interfaces) from addition of a non-port-range rule to the table. However, if the rule is configured as a port range rule (affirmative outcome to detection step 404), the port range configuration processing begins (step 410).

As an initial configuration step, a key mask value is generated for the port range (step 411) of the rule being added. For example, if the rule specifies a source port range for ports 1 to 4095, the key mask value of "0000**********" would be generated where the 12 asterisks represent mask values covering the range of decimal values 1-4095. In another example, the key mask value "00001*********" would be generated for a source port range for ports 2048 to 4095.

The next configuration step is to use the port range key mask value to generate a rule key mask value (step 412) that is hardware ACL compatible. To this end, the rule key mask value is constructed with the input parameters from all of the fields identified at step 402 (e.g., Source IP, Source Port, Destination IP, Destination Port, Protocol, the ingress and egress interfaces), except for the field(s) having a specified port range.

Based on the generated rule key mask value, the configuration process next determines if the ACL already includes a rule with a matching rule key mask value (step 413). If not (negative outcome to detection step 413), then the rule is added to the ACL lookup table and a new extended check node is added to the list and linked to the new rule (step 414). In selected embodiments, the processing at step 414 may be performed by the MFLU hardware accelerator 23 which stores the rule key mask value (from step 412) to the rule table and also updates the software-maintained list with a linked "extended check" node containing rule priority, port range, and corresponding action for the rule. However, if the ACL lookup table includes a matching rule (affirmative outcome to detection step 413), then a software-maintained list is updated to add the port range for the rule as one or more extended-check nodes (step 415). In selected embodiments, the extended-check node(s) in the software list include the corresponding rule's action, priority and port range, and are associated with the matching rule in the ACL table. To reduce the number of extended-check nodes being added to the rule, the rule key mask value (generated at step 412) should include as many bits from the "port" field as possible. In addition, the listing of extended check nodes in the software-maintained list may be ranked or sorted from highest priority to lowest priority, and may include algorithmic priority values (e.g., "1", "1+x", "1+(x+1)", etc.) in which smaller priority values have higher priority. Upon conclusion of the configuration processing step(s) 410, the control logic and methodology continue with normal processing operations (step 416).

Figure 5:
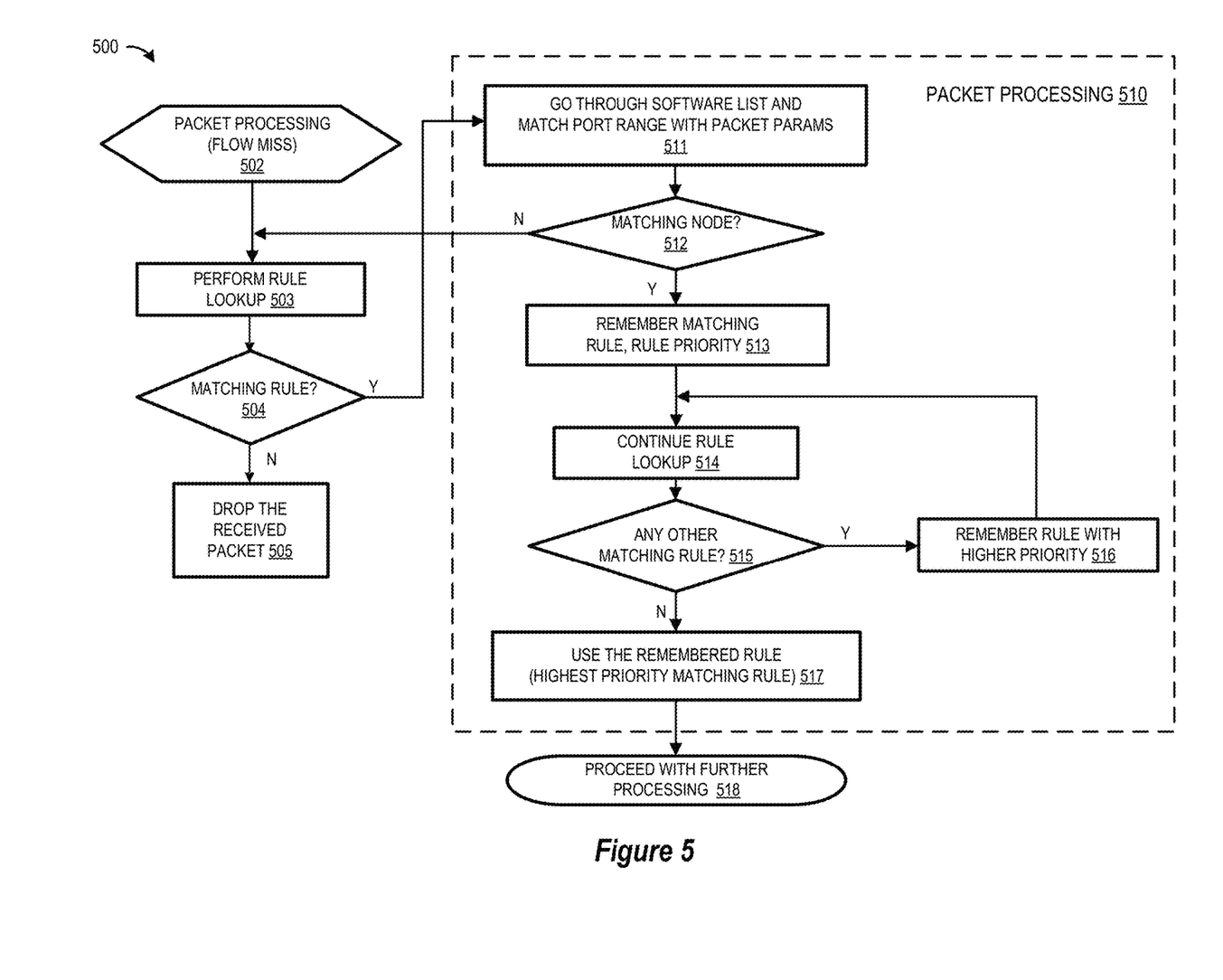
FIG. 5 depicts a simplified flow chart showing the packet processing logic for performing ACL table lookup operations to support port range rules in accordance with selected embodiments of the present disclosure.

To provide additional details for an improved understanding of selected embodiments of the present disclosure, reference is now made to FIG. 5 which depicts a simplified flow chart 500 showing the packet processing logic for performing ACL table lookup operations to support port range rules in accordance with selected embodiments of the present disclosure. In an example embodiment, the control logic and methodology shown in FIG. 5 may be implemented at least in part on a hardware accelerator circuit (such as an advanced input/output processor) that includes one or more ACL lookup tables and an extended node software list which are used to support port range rules.

The process starts (step 502) when packet processing for a new connection determines that there is a failure or miss, at which point a new session is created. In selected embodiments, the processing at step 502 may be implemented in software by the core(s) 20 as a precursor to the rule lookup operation. When there is a connection search failure or miss, a rule lookup operation is performed (step 503), such as by using the CTLU hardware accelerator 22 to perform an exact match search of the connection table 322 using specified packet field data from the incoming packet. In selected embodiments, the processing at step 503 may be implemented by the connection manager 312 which searches the firewall access control table 321 for the first matching rule.

If it is determined that there is no matching rule in the ACL lookup table (negative outcome to detection step 504), then the received packet is dropped (step 505). However, if there is a matching rule in the ACL lookup table that has a port range configured (affirmative outcome to detection step 504), then the packet processing steps (510) begin to identify the highest priority port range rule. However, if the matching rule does not have a port range configured, then that rule is directly used for further processing (step 518), as described hereinbelow.

As an initial packet processing step, the software-maintained list is scanned to find any extended check nodes with port ranges that match with the packet parameters extracted from the matching rule (step 511). If there are no matching extended check nodes (negative outcome to detection step 512), then the processing returns to the rule lookup step (step 503) and the process continues. However, if there is a matching extended node found (affirmative outcome to detection step 512), then matching rule and rule priority are stored or "remembered" for subsequent use (step 513). After finding a first matching extended node for the matching rule, the packet processing then resumes the ACL table rule lookup operations (step 514). If any additional matching rule is found in the ACL table (affirmative outcome to detection step 515), then the rule with the highest priority is stored or "remembered" for subsequent use (step 516). This iterative search for matching rules is repeated until there are no additional matching rules found in the ACL table (negative outcome to detection step 515), at which point the packet processing retrieves the "remembered" rule with highest priority for use as the matching rule in the ACL table (step 517). The control logic and methodology continue with normal packet processing operations (step 518).

As seen from the foregoing, the packet processing logic and methodology 500 avoid the performance limitations from using a "hardware only" process (with its attendant costs) or a "software only" process (with its attendant complexity from by using software encoding engines), instead using a hardware accelerator circuit (such as an advanced input/output processor) to perform a partial rule lookup operation in the ACL firewall access control table, and then using software to complete the rule lookup by searching a software list for the highest priority matching port range rule. In this approach, the packet processing hardware accelerator circuit may be readily scaled up and support thousands (e.g., 128,000) of ACL rules, each potentially have support for port ranges, thereby delivering excellent rule lookup performance during session creation. Of course, the present disclosure is not confined to use in supporting lookup operations for port range rules, but can also be applied to support rule lookup operations for rules that have IP address ranges.

Figure 6:
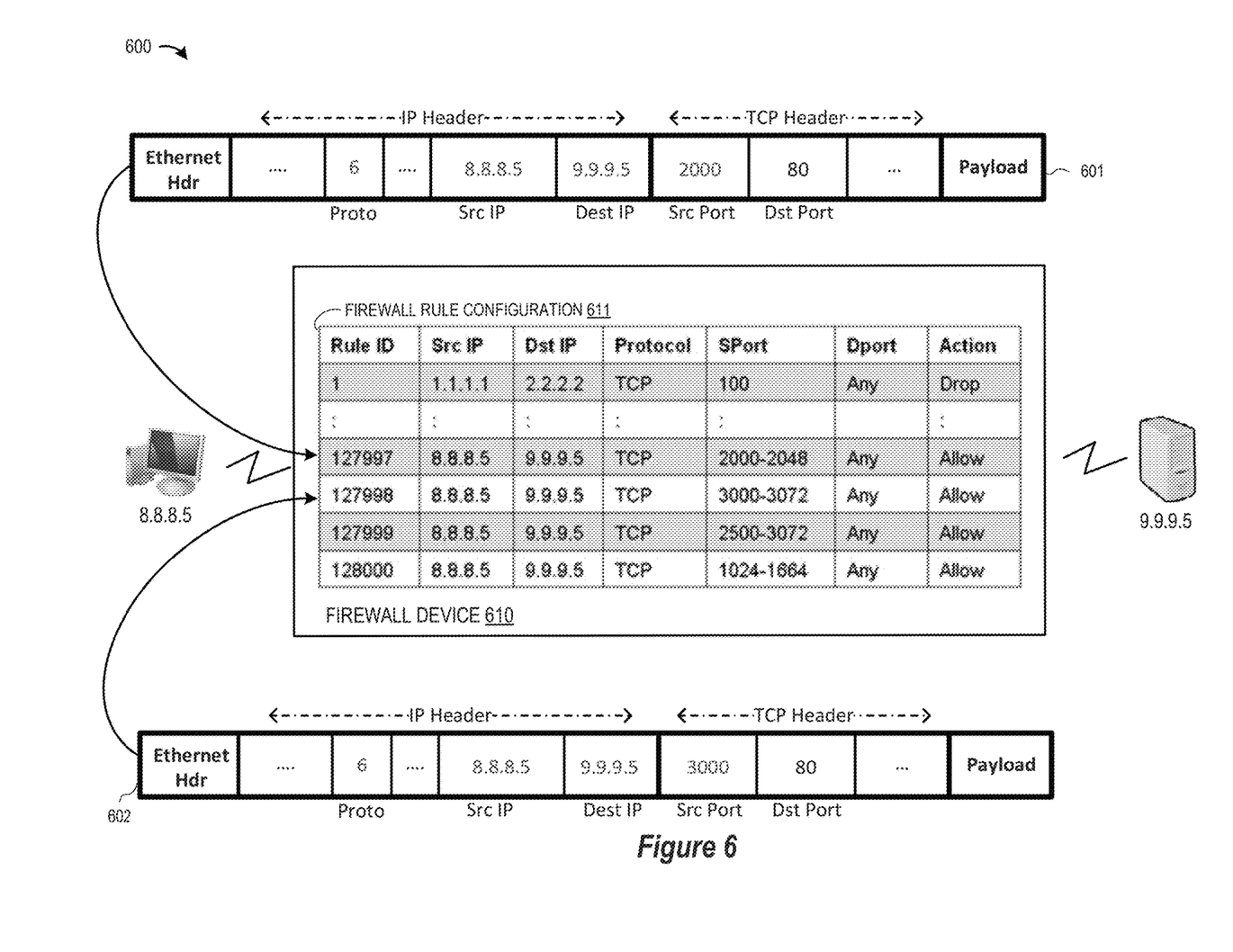
FIG. 6 depicts a communication network in which a firewall device uses a firewall rule configuration table to process TCP packets in accordance with selected embodiments of the present disclosure.

To provide additional details for an improved understanding of selected embodiments of the present disclosure, reference is now made to FIG. 6 which depicts a communication network 600 in which firewall device 610 is connected between a client computer 8.8.8.5 and a server computer 9.9.9.5 to receive and process TCP packets 601, 602 from different connections sent by the client computer 8.8.8.5. The first connection is specified by values in the TCP packet 601 which includes a packet header (e.g., Ethernet Hdr) followed by predetermined IP Header fields (e.g., Protocol, Src IP, Dest IP), TCP Header fields (e.g., Src Port, Dest Port, etc.), and a data payload portion. In similar fashion, the second connection is specified by values in the TCP packet 602 which includes a packet header followed by predetermined IP Header fields (e.g., Protocol, Src IP, Dest IP), TCP Header fields (e.g., Src Port, Dest Port, etc.), and a data payload portion. As indicated from the field values, the first TCP packet 601 has a Src Port field which has a port value of 2000 while the second TCP packet 602, has a port value of 3000, though the other relevant packet fields are identical.

When the TCP packet 601 from the first connection is received at the firewall device 610, a rule lookup operation is applied by extracting and applying the relevant selector values from the packet header (e.g., <SrcIP, DstIP, protocol, SrcPort, Dport>) as an input key to the firewall rule configuration table 611. In this case, a matching rule (e.g., Rule ID 127997) is identified as the highest priority rule having a source port range value (e.g., 2000-2048) which matches with the extracted source port value (e.g., 2000) from the TCP packet 601, and the corresponding rule "action" is performed (e.g., "Allow"), and the firewall device 610 passes or forwards the TCP connection packet(s) 601 to the server 9.9.9.5. In similar fashion, when the TCP packet 602 from the second connection is received at the firewall device 610, the rule lookup operation applies the extracted selector values to the firewall rule configuration table 611. In the case of the TCP packet 602, there are two matching rules (e.g., Rule ID 127998 and Rule ID 127999) having source port ranges (e.g., 3000-3072 and 2500-3072) which match the extracted source port value (e.g., 3000) from the TCP packet 602. From these matching rules, the matching rule (Rule ID 127998) is selected on the basis of being the highest priority rule in the ranked list of rules in the firewall rule configuration table 611, and the corresponding rule "action" is performed (e.g., "Allow") so that the firewall device 610 passes the TCP connection packet(s) 602 to the server 9.9.9.5. As disclosed herein, the packet processing operations for performing the lookup operations in firewall rule configuration table 611 may be implemented in a hardware accelerator circuit (such as an advanced input/output processor) that includes one or more processor cores for implementing control logic to perform partial lookup in one or more ACL lookup tables and to complete the rule lookup with software access of an extended node list.

Figure 7:
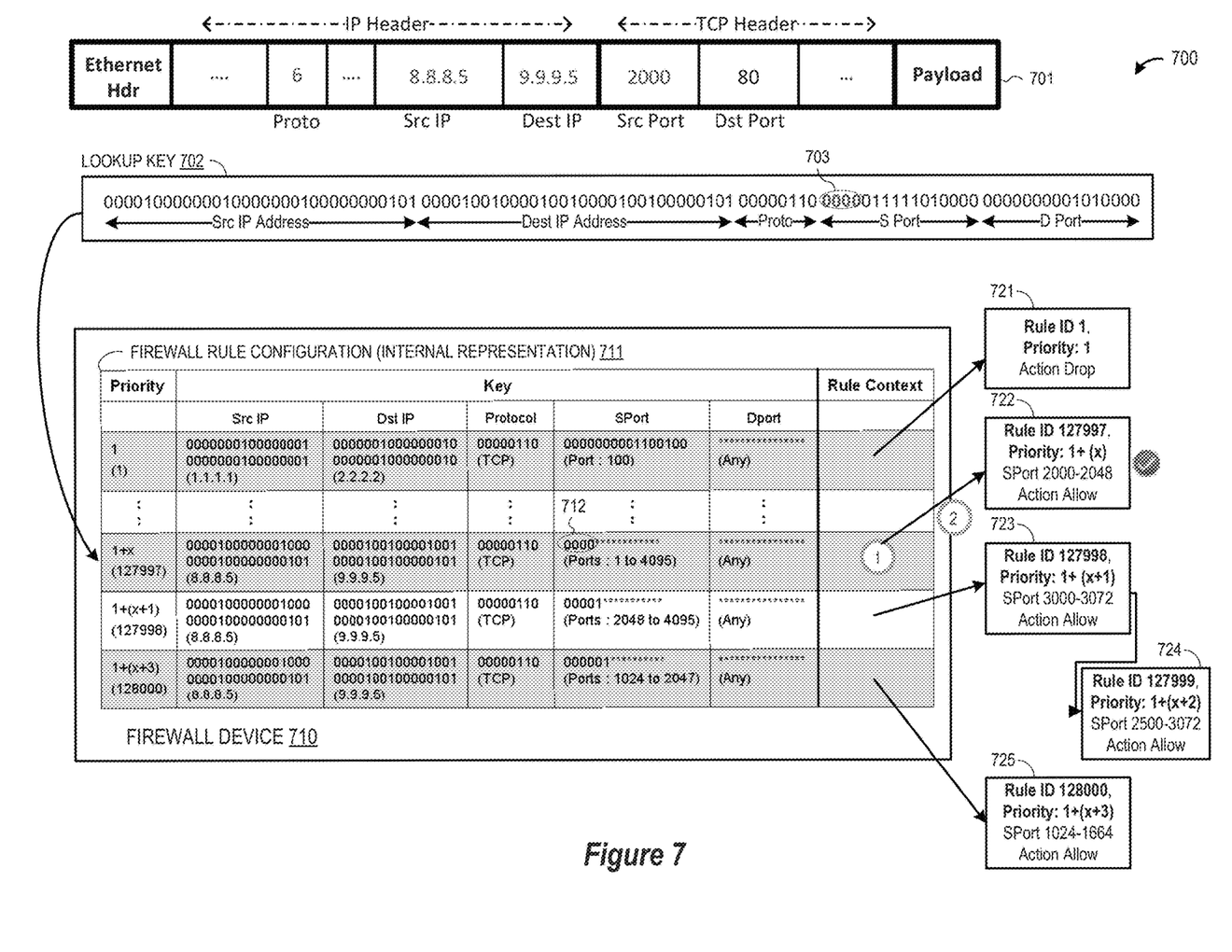
FIGS. 7-8 depict the operation of different lookup keys being applied to an ACL lookup table which is used with an extended node list to implement the firewall rule configuration table of FIG. 6.

To provide additional details for an improved understanding of selected embodiments of the present disclosure, reference is now made to FIG. 7 which depicts the "internal" operation of the firewall rule configuration table 711 at a firewall device 710 to illustrate how a first connection packet 701 is processed to expedite ACL rule lookup operations that include true port ranges. To illustrate the internal operation of the rule configuration table 711, each priority and rule key field is shown in binary form along with a parenthetical indication of the corresponding decimal value. In addition to including priority and rule key fields, each rule in the firewall rule configuration table 711 also includes a "Rule Context" field for storing a pointer to a corresponding "extended-check node" list location in memory 721-725 that software has programmed during the rule creation. In selected embodiments, the "extended-check node" (e.g., 722) referenced in the Rule Context field for each rule includes any "port range" values for "Source Port" and "Destination Port," a "Rule ID" value, a "Priority of rule" value, and an "Action" for the rule.

With this arrangement of the firewall rule configuration table 711, the first packet 701 received at the firewall device 710 is a TCP packet (Prot=6) from a source (Source IP=8.8.8.5, Source Port 2000) to a destination (Destination IP=9.9.9.5, Destination Port 80). Upon receipt at the firewall device 710, the connection packet 701 is processed to generate a lookup key 702 in which the selector fields are shown with binary key values corresponding to the field data values from the connection packet 701. For example, the decimal value for the Src Port (2000) is shown in the lookup key 702 with the binary value "0000011111010000." When the lookup key 702 is applied to the firewall rule configuration table 711, a matching rule (e.g., Rule ID 127997) is identified as the highest priority rule having a source port range value 712 (e.g., 0000************=1-4095) which matches the extracted source port value 703 (e.g., 2000) from lookup key 702 extracted from the TCP packet 701. This matching determination is made in a two-step process, starting with step "1" where the firewall rule configuration table 711 is accessed by the lookup key 702 to return the first matching rule (Rule ID 127997) from the ACL table along with the Rule Context pointer to the extended check node 722 for the matching Rule ID 127997. In step "2", software performs the "extended-check" by traversing the list of rules that has the "port-range" and cross-checking if the packet's source port matches the rule's source port-range. If there is a match, then that rule is used. With the example packet 701, the packet's source port is "2000," and the matching rule ID "127997" has a source port range "2000-2048" as part of "extended-check." Since the port number 2000 is part of the range "2000-2048," this rule is considered as matched and used. At this point, since the first "extended-check" node matched, no further hardware ACL rule lookup is required and the rule with ID "127997" is the final matched rule.

Figure 8:
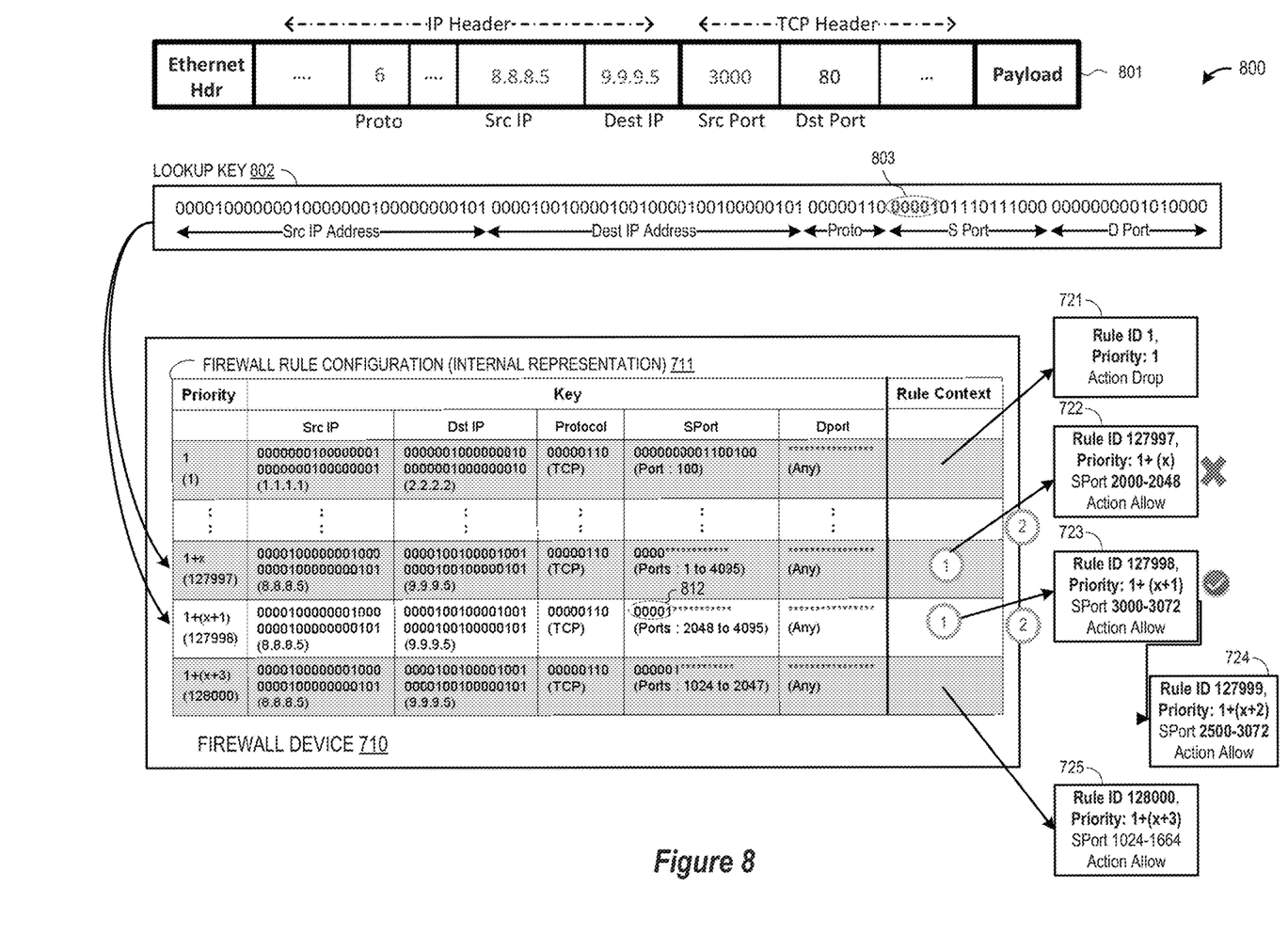

To provide additional details for an improved understanding of selected embodiments of the present disclosure, reference is now made to FIG. 8 which depicts the "internal" operation of the firewall rule configuration table 711 at the firewall device 710 to illustrate how a second connection packet 801 is processed to expedite ACL rule lookup operations that include true port ranges. As depicted, the second packet 801 is a TCP packet (Prot=6) from a source (Source IP=8.8.8.5, Source Port 3000) to a destination (Destination IP=9.9.9.5, Destination Port 80). Upon receipt at the firewall device 710, the connection packet 801 is processed to generate a lookup key 802 in which the selector fields are shown with binary key values corresponding to the field data values from the connection packet 801. In particular, the decimal value for the Src Port (3000) is shown in the lookup key 802 with the binary value "0000101110111000," which includes the most significant lead bits 803 (e.g., 00001"). When the lookup key 802 is applied to the firewall rule configuration table 711, the two-step matching process first applies the hardware step "1" to return the first matching rule from the ACL (e.g., Rule ID 127997) that has a source port range value (e.g., 1-4095) which matches the extracted source port value 803 (e.g., 3000) from lookup key 802 extracted from the TCP packet 801. However, the second software step "2" checks the extended check node 722 referenced from the Rule Context of the first matching rule which specifies a source port range of "2000-2048," and determines that packet's source port does not match the rule's source port range.

In the absence of a port range match with the first matching rule, the two-step matching process is repeated in software by accessing the firewall rule configuration table 711 starting from the next priority after "1+x". As a result, the hardware step "1" is resumed to identify the next matching rule with the priority "1+x+1" (e.g., Rule ID 127998) from the ACL table along with the Rule Context pointer to the extended check node 723 for the matching Rule ID 127998. In step "2", software performs the "extended-check" by traversing the list of rules that has the "port-range" and cross-checking if the packet's source port matches the rule's source port-range. In the depicted example, there are 2 rules in the list, Rule ID 127998 and 127999. The first rule (Rule ID 127998) has the source port range "3000-3072" identified in the extended node 723, and the next rule (Rule ID 127999) in the list has source port range "2500-3072" identified in the extended node 724. Since the list is arranged in decreasing order of priority, the first rule in the list (Rule ID 127998) has highest priority in the list and the last rule in the list has the lowest priority in the list. Since the TCP packet 802 has a source port value (e.g., "3000") that matches with the first "extended-check" node 723's listed source port range (e.g., "3000-3072"), the rule ID ("127998") is matched and the "extended-check" is stopped since the list is order in the decreasing order of priority. At this point, since the first "extended-check" node matched, no more hardware ACL rule lookup is required and the rule with ID "127998" is the final matched rule.

Figure 9:
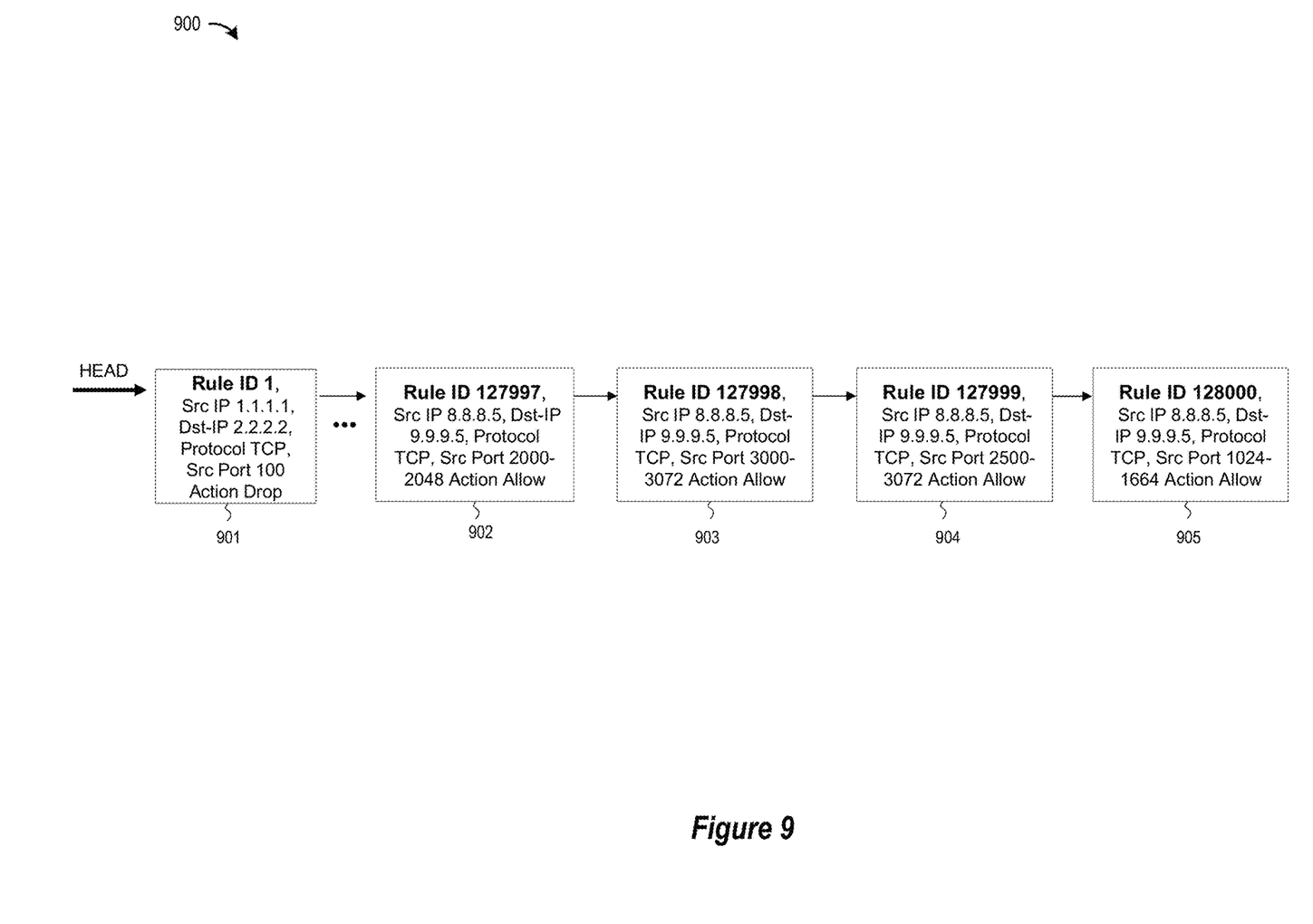
FIG. 9 depicts an alternative software-based approach for using a linked list representation in accordance with selected embodiments of the present disclosure.

To provide additional details for an improved understanding of selected embodiments of the present disclosure, reference is now made to FIG. 9 which depicts a simplified flow chart 900 showing the packet processing logic for a software-based approach which uses a linked list representation 901-905 to perform ACL table lookup operations to support port range rules in accordance with selected embodiments of the present disclosure. In an example embodiment, the control logic and methodology shown in FIG. 9 may be implemented entirely in software without any hardware assist. In this approach, rule lookups are done in software by searching each rule entry in a software managed access control list, starting with the first rule entry 901, and then proceeding down the list to evaluate the remaining rule entries 902-905. As illustrated, the rule entries 901-905 in the ACL are ordered based on their respective priorities, and also include rules that do not have true-port-ranges. Thus, a first rule entry 901 specifies a first, highest priority rule (Rule ID 1) having a specified action ("Drop") for a TCP packet sent by a source (Source IP=1.1.1.1, Source Port 100) to a destination (Destination IP=2.2.2.2). There are numerous additional rule entries, including a lower priority rule (Rule ID 127997) having a specified action ("Allow") for a TCP packet sent by from a source (Source IP=8.8.8.5, Source Port Range=2000-2048) to a destination (Destination IP=9.9.9.5), an even lower priority rule (Rule ID 127998) having a specified action ("Allow") for a TCP packet sent by from a source (Source IP=8.8.8.5, Source Port Range=3000-3072) to a destination (Destination IP=9.9.9.5), an even lower priority rule (Rule ID 127999) having a specified action ("Allow") for a TCP packet sent by from a source (Source IP=8.8.8.5, Source Port Range=2500-3072) to a destination (Destination IP=9.9.9.5), and a lowest priority rule (Rule ID 128000) having a specified action ("Allow") for a TCP packet sent by from a source (Source IP=8.8.8.5, Source Port Range=1024-1664) to a destination (Destination IP=9.9.9.5).

As will be appreciated, it is important to protect the ACL rules list 901-905 in order to be able to perform "safe" updates to reflect latest configuration while simultaneously servicing new connection requests that require traversing the rules 901-905. Such protection can reduce the session creation rate and the rule update rates, especially in applications where 100,000+ rules are configured. As a result, there are performance drawbacks from using a software-based approach for performing ACL lookups in the ACL list 901-905. For example, the time required to match a rule depends on the position of rule in the ACL list 901-905, and as the total number of configured rules increases, the time taken to match a rule increases. In application where 100, 000+ rules are configured, the session creation rate drops significantly.

By now it should be appreciated that there has been provided an apparatus, method, program code, and system for efficiently performing rule lookups that include rules with address ranges which can refer to IP address ranges and/or TCP/UDP true port ranges. In the disclosed embodiments, a received network packet is evaluated at a network element using a hardware access control list to identify a first rule key portion in the hardware access control list having a first address range indicator value that matches with an address value in the network packet. The first rule key portion is then used to search a software-maintained list of one or more extended check nodes linked with the first rule key portion to identify a first extended check node having a first address range value that matches with the address value in the network packet. In selected embodiments, the extended check nodes are arranged in a ranked order from highest priority to lowest priority. In other embodiments, the hardware access control list embodies a firewall rule configuration table stored in a memory (e.g., DRAM) so that the network packet may be evaluated by comparing the first rule key portion to entries in the memory to retrieve a reference pointer to an address in memory for the list of one or more extended check nodes, each of which may include a rule priority and specified action associated with the first address range value. Once the first extended check node is identified, the network element selects one or more actions to be performed from actions contained in the first extended check node that is separate from the hardware access control list. In selected embodiments, the first address range indicator value is a source or destination port range value and the address value is a source or destination port value. In other embodiments, the first address range indicator value is a source or destination IP address range value and the address value is a source or destination IP address value. Prior to packet processing operations, the hardware access control list and the list of one or more extended check nodes may be configured with a lookup rule by generating the first rule key portion for storage in the hardware access control list, and then generating the first extended check node for storage in the list of one or more extended check nodes.

In another form, there is provided a networking element and associated method of operation for efficiently performing rule lookups that include rules with range indicator values which can refer to IP address ranges and/or TCP/UDP true port ranges. In selected embodiments, the network element includes a central processing unit connected over a coherency fabric to a memory and a data packet processor having one or more processor cores connected to a table lookup hardware accelerator for accessing a hardware access control list. In selected embodiments, the memory is a DRAM in which the hardware access control list is stored as a firewall rule configuration table. Thus connected, the data packet processor may use the table lookup hardware accelerator to evaluate a received network packet to identify a first rule key portion in the hardware access control list having a first range indicator value (e.g., a source or destination port range value) for a packet header field that matches with a packet header field value (e.g., a source or destination port number) in the network packet. In selected embodiments, the table lookup hardware accelerator evaluates the received network packet by comparing the first rule key portion to entries in the firewall rule configuration table to retrieve a reference pointer to an address in memory for a list of extended check nodes. In addition, the data packet processor may use the one or more processor cores to search the list of extended check nodes linked with the first rule key portion to identify a first extended check node having a first range value for the packet header field that matches with the packet header field value in the network packet. In selected embodiments, the first range indicator value for the packet header field may be a source or destination port range value and the packet header field value may be a source or destination port value. In other embodiments, the first range indicator value for the packet header field may be a source or destination IP address range value and the packet header field value may be a source or destination IP address value. In selected embodiments, the extended check nodes are arranged in the list in a ranked order from highest priority to lowest priority, with each extended check node including a rule priority and specified action associated with the first range value for the packet header. Once the first extended check node is identified, the data packet processor selects one or more actions to be performed by the network element from actions contained in the first extended check node. Prior to packet processing operations, the central processing unit may be connected to configure the hardware access control list and the list of extended check nodes with a lookup rule by generating the first rule key portion for storage in the hardware access control list, and generating the first extended check node for storage in the list of one or more extended check nodes.

In yet another form, there is disclosed a system for filtering received data units. The disclosed system includes a memory structure adapted to store a firewall rule configuration table as hardware access control list, each entry in the hardware access control list comprising one or more key-bits and an address range indicator value corresponding to a filter rule for a data unit. The system also includes a data packet processing element having one or more processor cores connected to a table lookup hardware accelerator for accessing the hardware access control list in the memory structure. In operation, the data packet processing element evaluates a received data unit using the table lookup hardware accelerator to identify a first rule key portion in the hardware access control list having a first address range indicator value that matches with an address value in the data unit. In addition, the data packet processing element searches a list of one or more extended check nodes linked with the first rule key portion using the one or more processor cores to identify a first extended check node comprising a first address range value that matches with the address value in the data unit, a rule priority, and specified filtering action for the data unit associated with the first address range value. In selected embodiments, the extended check nodes are arranged in a ranked order from highest priority to lowest priority. Finally, the data packet processing element selects one or more actions to be performed by the system to filter the received data unit, wherein the one or more actions are contained in the first extended check node. In selected embodiments, the first address range indicator value may be a source or destination port range value and the address value may be a source or destination port value. In other embodiments, the first address range indicator value may be a source or destination IP address range value and the address value may be a source or destination IP address value.

As disclosed herein selected aspects of the present disclosure may be implemented at least in part in software which manages a software list of extended check nodes which provide port range values, priority values and rule actions that are linked or associated with a matching rule in a hardware ACL lookup table. In addition, table lookup operations may be accelerated by using a hardware ACL lookup table to perform a partial rule lookup operation under control of a computer program product which comprises code portions for executing steps of a method as described above when run on a programmable apparatus. As will be understood by those skilled in the art, a computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, and point-to-point telecommunication equipment, just to name a few.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the disclosed software operations may be implemented by the core(s) 21 or any other processing element 10, 12. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Although the described exemplary embodiments disclosed herein for supporting ACL rule lookups are described with reference to various implementation details for using hardware ACL to performing partial rule lookup and for using software to complete the rule lookup to include TCP/UDP true port ranges, the present invention is not necessarily limited to the example embodiments illustrate herein. For example, various embodiments may be implemented to support NAT rules with TCP/UDP port range values, to support rules with IP address ranges and not just port ranges. The methods and systems for shown and described herein may be implemented to support dynamic ACL rule addition or deletion involving port ranges or IP address range, making it possible to high rates of rule additions (example 10,000+/Sec) that include port ranges or IP address ranges. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    configuring a hardware access control list and a software-maintained list of one or more extended check nodes with a lookup rule;
    evaluating a network packet received at a network element using the hardware access control list to identify a first rule key portion in the hardware access control list comprising a first address range indicator value that matches with a first address value portion in the network packet;
    searching the software-maintained list of one or more extended check nodes linked with the first rule key portion by a pointer in the first rule key portion and ranked by priority to identify a first extended check node comprising a first address range value that matches with the first address value portion in the network packet, where each extended check node comprises an address range value and a specified action; and selecting one or more actions to be performed by the networking element, wherein the one or more actions are identified as the specified action contained in the first extended check node that is maintained in software separately from the hardware access control list;

where configuring the hardware access control list and the software-maintained list of one or more extended check nodes comprises:

generating one or more rule key portions for storage in the hardware access control list, where at least one rule key portion comprises a first key mask value for a port range for the first rule key portion; and generating one or more extended check nodes for storage in the list of one or more extended check nodes, where evaluating the network packet comprises generating a lookup key comprising a plurality of selector fields which is applied to index into the hardware access control list to identify the first rule key portion.

2. The method of claim 1, where the hardware access control list comprises a firewall rule configuration table stored in a dynamic random access memory (DRAM).

3. The method of claim 2, where evaluating the network packet comprises retrieving, from the first rule key portion in the DRAM, a reference pointer to an address in memory for the list of one or more extended check nodes.

4. The method of claim 3, where each of the one or more extended check nodes comprises a rule priority value.

5. The method of claim 1, where the one or more extended check nodes are arranged in a ranked order from highest priority to lowest priority.

6. The method of claim 1, where the first address range indicator value comprises a key mask value indicating a first source or destination port range value that is different from the first address range value and where the first address value portion comprises a source or destination port value.

7. The method of claim 1, where the first address range indicator value comprises a key mask value indicating a first source or destination IP address range value that is different from the first address range value and where the first address value portion comprises a source or destination IP address value.

8. A networking element, comprising:

a data packet processor comprising one or more processor cores connected to a table lookup hardware accelerator for accessing a hardware access control list, where the data packet processor is configured to:

evaluate a received network packet using the table lookup hardware accelerator to identify a first rule key portion in the hardware access control list comprising a first range indicator value for a packet header field that matches with a packet header field value in the network packet;

search a software-maintained list of one or more extended check nodes that are ranked by priority and linked with the first rule key portion by a pointer in the first rule key portion using the one or more processor cores to identify a first extended check node comprising a first range value for the packet header field that matches with the packet header field value in the network packet, where each extended check node comprises an address range value and a specified action; and select one or more actions to be performed by the networking element, wherein the one or more actions are identified as the specified action contained in the first extended check node that is maintained in software separately from the hardware access control list; and a central processing unit connected to configure the hardware access control list and the software-maintained list of one or more extended check nodes with a lookup rule by:

generating one or more rule key portions for storage in the hardware access control list, where at least one rule key portion comprises a first key mask value for a port range for the first rule key portion; and generating one or more extended check nodes for storage in the software-maintained list of one or more extended check nodes, where the data packet processor is configured to evaluate the network packet by generating a lookup key comprising a plurality of selector fields which is applied to index into the hardware access control list to identify the first rule key portion.

9. The networking element of claim 8, further comprising a dynamic random access memory (DRAM) in which the hardware access control list is stored as a firewall rule configuration table.

10. The networking element of claim 9, where table lookup hardware accelerator evaluates the received network packet by retrieving, from the first rule key portion in the firewall rule configuration table, a reference pointer to an address in memory for the list of one or more extended check nodes.

11. The networking element of claim 10, where each of the one or more extended check nodes comprises a rule priority value.

12. The networking element of claim 8, where the one or more extended check nodes are arranged in the list in a ranked order from highest priority to lowest priority.

13. The networking element of claim 8, where the first range indicator value for the packet header field comprises a key mask value indicating a first source or destination port range value that is different from the first range value and where the packet header field value comprises a source or destination port value.

14. The networking element of claim 8, where the first range indicator value for the packet header field comprises a key mask value indicating a first source or destination IP address range value that is different from the first range value and where the packet header field value comprises a source or destination IP address value.

15. A system for filtering received data units, comprising:

a memory structure adapted to store a firewall rule configuration table as a hardware access control list, each entry in the hardware access control list comprising one or more key-bits and an address range indicator value corresponding to a filter rule for a data unit;

a data packet processing element comprising one or more processor cores connected to a table lookup hardware accelerator for accessing the hardware access control list in the memory structure to:

evaluate a received data unit using the table lookup hardware accelerator to identify a first rule key portion in the hardware access control list having a first address range indicator value that matches with a first address value portion in the data unit, search a software-maintained list of one or more extended check nodes that are ranked by priority and linked with the first rule key portion by a pointer in the first rule key portion using the one or more processor cores to identify a first extended check node comprising a first address range value that matches with the first address value portion in the data unit, a rule priority, and specified filtering action for the data unit associated with the first address range value, and select one or more actions to be performed by the system to filter the received data unit, wherein the one or more actions are identified in the specified filtering action contained in the first extended check node that is maintained in software separately from the hardware access control list; and a central processing unit connected to configure the hardware access control list and the software-maintained list of one or more extended check nodes with a lookup rule by:

generating one or more rule key portions for storage in the hardware access control list, where at least one rule key portion comprises a first key mask value for a port range for the first rule key portion; and generating one or more extended check nodes for storage in the software-maintained list of one or more extended check nodes, where the data packet processor is configured to evaluate the network packet by generating a lookup key comprising a plurality of selector fields which is applied to index into the hardware access control list to identify the first rule key portion.

16. The system of claim 15, where the one or more extended check nodes are arranged in a ranked order from highest priority to lowest priority.

17. The system of claim 15, where the first address range indicator value comprises a key mask value indicating a first source or destination port range value that is different from the first address range value and where the first address value portion comprises a source or destination port value.

18. The system of claim 15, where the first address range indicator value comprises a key mask value indicating a first source or destination IP address range value that is different from the first address range value and where the first address value portion comprises a source or destination IP address value.

* * * * *